United States Patent [19]

Hidaka

[11] Patent Number: 5,086,223
[45] Date of Patent: Feb. 4, 1992

[54] IMAGE FORMING APPARATUS AND METHOD FOR REMOVAL OF HIGH FREQUENCY IMAGE JITTER

[75] Inventor: Shinobu Hidaka, Sagamihara, Japan

[73] Assignee: Minolta Camera Kabushiki Kaisha, Osaka, Japan

[21] Appl. No.: 557,724

[22] Filed: Jul. 20, 1990

[30] Foreign Application Priority Data

Jul. 21, 1989 [JP] Japan .................. 1-187321

[51] Int. Cl.⁵ .................. H01J 3/14
[52] U.S. Cl. .................. 250/235; 358/494
[58] Field of Search .................. 250/235–236; 358/408, 494, 481

[56] References Cited

U.S. PATENT DOCUMENTS

| | | | |
|---|---|---|---|
| 3,999,010 | 12/1976 | Oosaka et al. | 358/302 |
| 4,694,156 | 9/1987 | Swanberg | 358/481 |
| 4,872,065 | 10/1989 | Isono et al. | 358/494 |
| 4,920,430 | 4/1990 | Isomo et al. | 358/494 |
| 4,962,981 | 10/1990 | Muratami et al. | 250/235 |

FOREIGN PATENT DOCUMENTS 63-175817  7/1988  Japan .

Primary Examiner—David C. Nelms
Assistant Examiner—S. Allen
Attorney, Agent, or Firm—Price, Gess & Ubell

[57] ABSTRACT

The characteristics of the component reflecting surfaces of a polygonal-prism mirror are determined by detecting the times of scanning between two given points on each of the component reflecting surfaces. The times for starting the delivery of the output of a video signal for imposition on the scanning lines on the component reflecting surfaces are severally calculated based on the characteristics mentioned above. The video clock is issued with prescribed time cycles based on the times for starting the delivery of output found by the arithmetic operation mentioned above.

32 Claims, 5 Drawing Sheets

IMAGE FORMING APPARATUS AND METHOD FOR REMOVAL OF HIGH FREQUENCY IMAGE JITTER

BACKGROUND OF THE INVENTION

1. Field of the Invention

This invention relates to an image forming apparatus which causes a beam of light to sweep a surface by the rotation of a rotary polygonal-prism mirror and a method for image formation with the apparatus. More particularly, this invention relates to an image forming apparatus which causes the high-frequency jitter caused mainly by errors in the angular division of the aforementioned polygonal-prism mirror to be eliminated in the central part of a formed image and a method for image formation with the apparatus.

2. Description of the Prior Art

The conventional image forming apparatus is designed to form an image by modulating a laser beam emitted from a laser beam oscillator with an image signal and polarizing the modulated laser beam with a rotary polygonal-prism mirror such as a polygon mirror thereby causing the laser beam to scan a recording medium.

The rotary polygonal-prism mirror which is used in the image forming apparatus of this operating principle plays an important role in the formation of an image and enjoys many advantages such as a large polarizing angle and inability to cause spectral diffraction. It is nevertheless susceptible of errors in angular division because it is not in the least easily fabricated with high accuracy.

When these errors in angular division are present, the starting position and the ending position of the scanning line of the laser beam are varied from one mirror surface to another and the array of picture elements in the direction of scanning inevitably deviates from one scanning line to another.

Once this deviation occurs, the image of a straight line that the apparatus is caused to draw perpendicularly to the direction of scanning is expressed not as a strictly straight line but as a periodically undulating curve from a microscopic point of view, for example.

For the purpose of eliminating the inconvenience, there has been followed the practice of disposing a sensor near the position for starting the scanning with the laser beam thereby ensuring coincidence of the starting position S of scanning lines as illustrated in FIG. 6 and allowing the issuance of a video signal to start after the sensor's detection of the laser beam thereby attaining alignment of the positions for starting image formation.

In the conventional apparatus embodying this practice, the positions S for starting image formation may be indeed aligned in all of the scanning lines 1 to 8 (where the rotary polygonal-prism mirror has 8 mirror surfaces) produced severally by the individual mirror surface of the rotary polygonal-prism mirror, the ending positions E of the scanning lines cannot be aligned in the presence of errors in plane division as illustrated in FIG. 6. This misalignment inevitably entails a maximum deviation P or high-frequency jitter at the ending positions. This high-frequency jitter periodically appears after each complete rotation of the rotary polygonal-prism mirror.

With reference to the concrete example cited above, the image of a straight line perpendicular to the direction of scanning is expressed as a straight line near the starting positions S at which the video signal is delivered to the scanning lines, whereas the same image is prevented from being expressed as a straight line near the ending positions E by the phenomenon of jitter. In other words, the deviations in the arrays of picture elements in the scanning lines gradually increase in the direction of scanning from the starting positions S to the ending positions E, with the inevitable result that the produced image will be disfigured as a whole in the direction of scanning.

SUMMARY OF THE INVENTION

This invention, conceived in the urge to eliminate the problems of the prior art described above, aims to provide an image forming apparatus designed to curb the occurrence of high-frequency jitter by controlling the starting positions of scanning lines destined to undergo imposition of a video signal in conformity with the characteristics of the individual mirror surfaces of the rotary polygonal-prism mirror and a method for effecting the image formation with the apparatus.

In the image forming apparatus of the present invention, arithmetic means detects the characteristics of the component mirror surfaces of the aforementioned rotary polygonal-prism mirror, namely the errors in surface division, by clocking the scanning time between two given points on each of the mirror surfaces, control means determines on the component mirror surfaces the times for starting the issuance of a video signal for imposition on the scanning lines from the component mirror surfaces in due respect of the errors of surface division and feeds out video clocks with prescribed time cycles based on the times for starting the output determined thereby.

The times for starting the imposition of video clocks are different from one scanning line to another and, therefore, may incite an impression that the high-frequency is not eliminated. Actually, however, the influence of high-frequency jitter disappears substantially completely near the central part of the produced image.

DETAILED DESCRIPTION OF THE INVENTION

Now, the present invention as embodied will be described in detail below with reference to the accompanying drawings.

Figure 1:
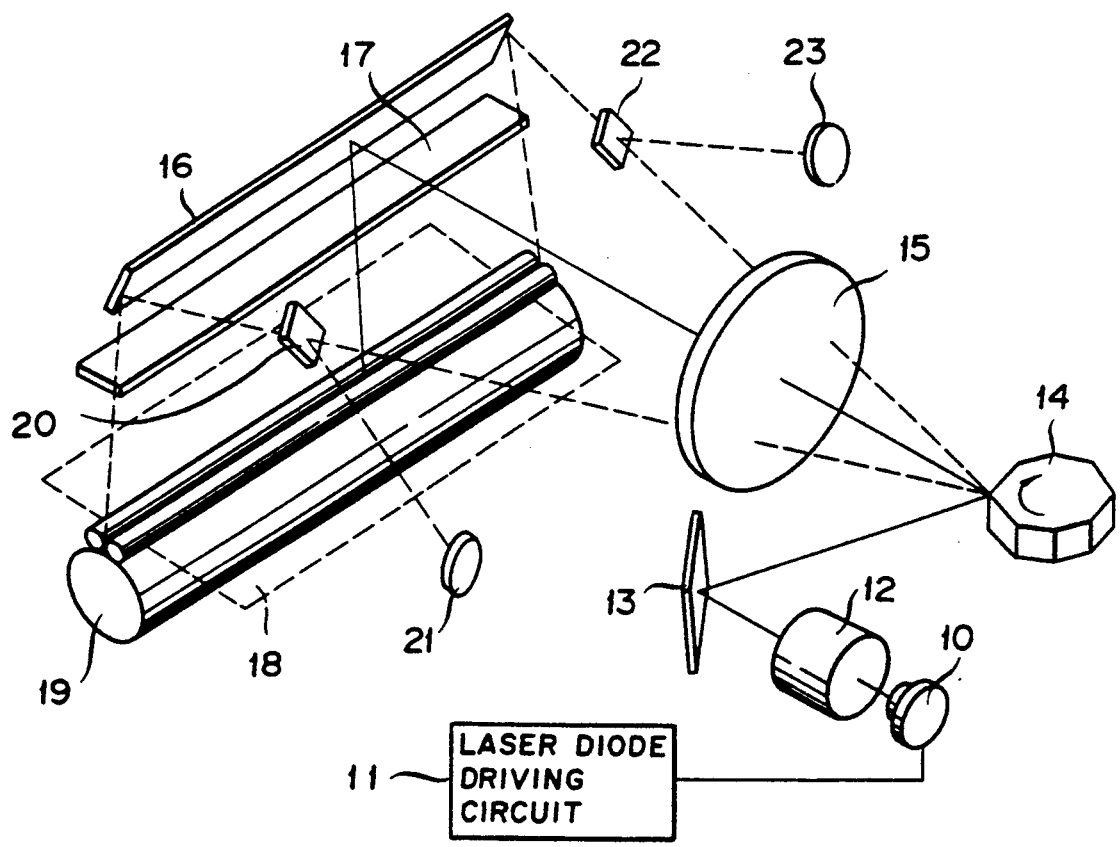
FIG. 1 is a schematic structural diagram of a laser beam printer provided with a light beam scanning device of the present invention.
Figure 2:
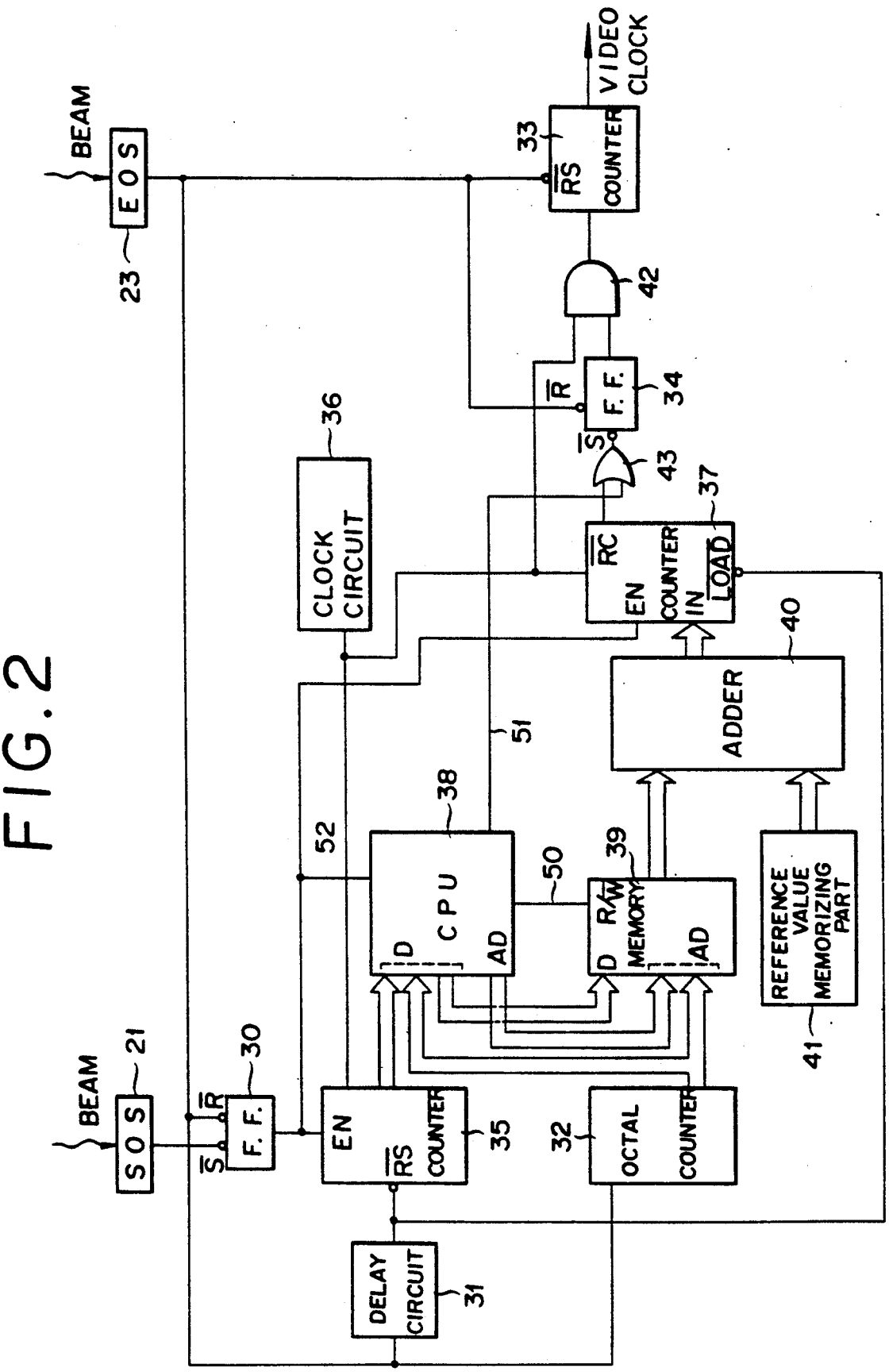
FIG. 2 is a schematic block diagram of the light beam scanning device of the present invention.

FIG. 1 is a schematic structural diagram of a laser beam printer provided with the light beam scanning device of the present invention and FIG. 2 a schematic block diagram of the light beam scanning device of the present invention.

The laser beam printer illustrated in FIG. 1 is provided with a laser diode 10 for issuing a laser beam. The laser beam, as the light beam issued from this laser diode 10, is modulated in accordance with a signal from a laser diode driving circuit 11. The modulated laser beam is collimated with a collimator lens 12, reflected on a mirror 13, and again reflected on the component mirror surfaces of a polygon mirror 14 as one example of the rotary polygonal-prism mirror. The laser beam is caused to effect main scanning by the rotation of the polygon mirror 14 possessing 8 reflecting surfaces. The scanning laser beam is converged with a f-θ lens 15 and caused to impinge on a sensitive material 18 through the medium of a mirror 16 and a window glass 17. By causing the scanning laser beam to sweep the sensitive material 18 which is advanced with a drum 19, an image is formed on the sensitive material 18. The scanning is similarly effected when an image is formed on a copying paper by the well-known method of projecting the laser beam on the sensitive material.

Immediately in front of the position for starting the main scanning, a detector comprising a reflecting mirror 20 and a sensor 21 such as a photodiode and serving to detect passage of a laser beam prior to the sweep of one scanning line, namely a detector corresponding to an SOS (Start of Scan) sensor illustrated in FIG. 2, is disposed. Immediately behind the position for ending the main scanning, a detector comprising a reflecting mirror 22 and a sensor 23 such as a photodiode and serving to detect passage of a laser beam after completion of the sweep of one scanning line, namely a detector corresponding to an EOS (End of Scan) sensor illustrated in FIG. 2, is disposed. The characteristics of the component reflecting surfaces of the polygon mirror 14 are determined by the difference between the times of detection of the laser beam by the sensor 21 and the sensor 23.

The SOS sensor 21 is connected to the set terminal of a flipflop 30 and the EOS sensor 23 is connected to the reset terminal of the flipflop 30 and to the reset terminals respectively of a delay circuit 31, an octal counter 32, a counter 33 for issuing a video clock, and a flipflop 34 as illustrated in FIG. 2. The flipflop 30 is set to actuate a counter 35 when the SOS sensor 21 detects the laser beam. It is reset to render the counter 35 inactive when the EOS sensor 23 detects the laser beam. The counter 35 takes count of a basic clock emitted from a clock circuit 36 while the flipflop 30 is retained in the set state. The operation of the counter 35 in counting the basic clock, therefore, is completed when the EOS sensor 23 detects the laser beam and the flipflop 30 is reset. The numeral of count registered in the counter 35 is retained until a signal is injected into the reset terminal. The delay circuit 31 begins operating when the EOS sensor 23 detects the laser beam and, on elapse of a fixed time, issues a signal to the counter 35 and a counter 37. Since the reset terminal of the counter 35 and the load terminal of the counter 37 are connected to the delay circuit 31, the counter 35 resets the numeral of count stored therein to 0 and the counter 37 admits data through the input terminal when the delay circuit 31 issues a signal. The octal counter 32 is a counter for giving an increment of 1 to the numeral displayed in the range of 1 to 8. each time the EOS sensor 23 detects the laser beam. It has set therein addresses corresponding to the 8 component reflecting surfaces of the polygon mirror 14. The counter 35 and the octal counter 32 are connected respectively to a CPU 38 and memory 39. The CPU 38 reads in the numeral of count registered on the counter 35 and the numeral of count on the octal counter 32 serving to designate an address and memorizes the numeral of count of the counter 35 at the address designated by the octal counter 32 immediately when the flipflop 30 is reset. The CPU 38 performs an arithmetic operation of the kind described hereinbelow based on the total of 8 numerals of count introduced from the counter 35 and commits the outcome of this operation to storage in the memory 39. An adder 40 calculates the sum of the data introduced from the memory 39 and the data from a reference value memorizing part 41 serving to memorize the standard value present at the time of starting the issuance of output from the video clock and delivers the outcome of the calculation to the counter 37. The counter 37 calculates the deduction of the data introduced from the adder 40 based on the basic clock issued from the clock circuit 36 and, when the numeral of count in the counter 37 is found by the deduction to be 0, emits a signal through a ripple carrier (RC) terminal thereof. By this signal issued from the counter 37, the flipflop 34 is reset through the medium of an OR gate 43. The counter 33, while the flipflop 34 is retained in the set state, admits the basic clock issued from the clock circuit 36 through an AND gate 42 and proceeds to form a video clock by dividing a frequency of the introduced basic clock.

Figure 3:
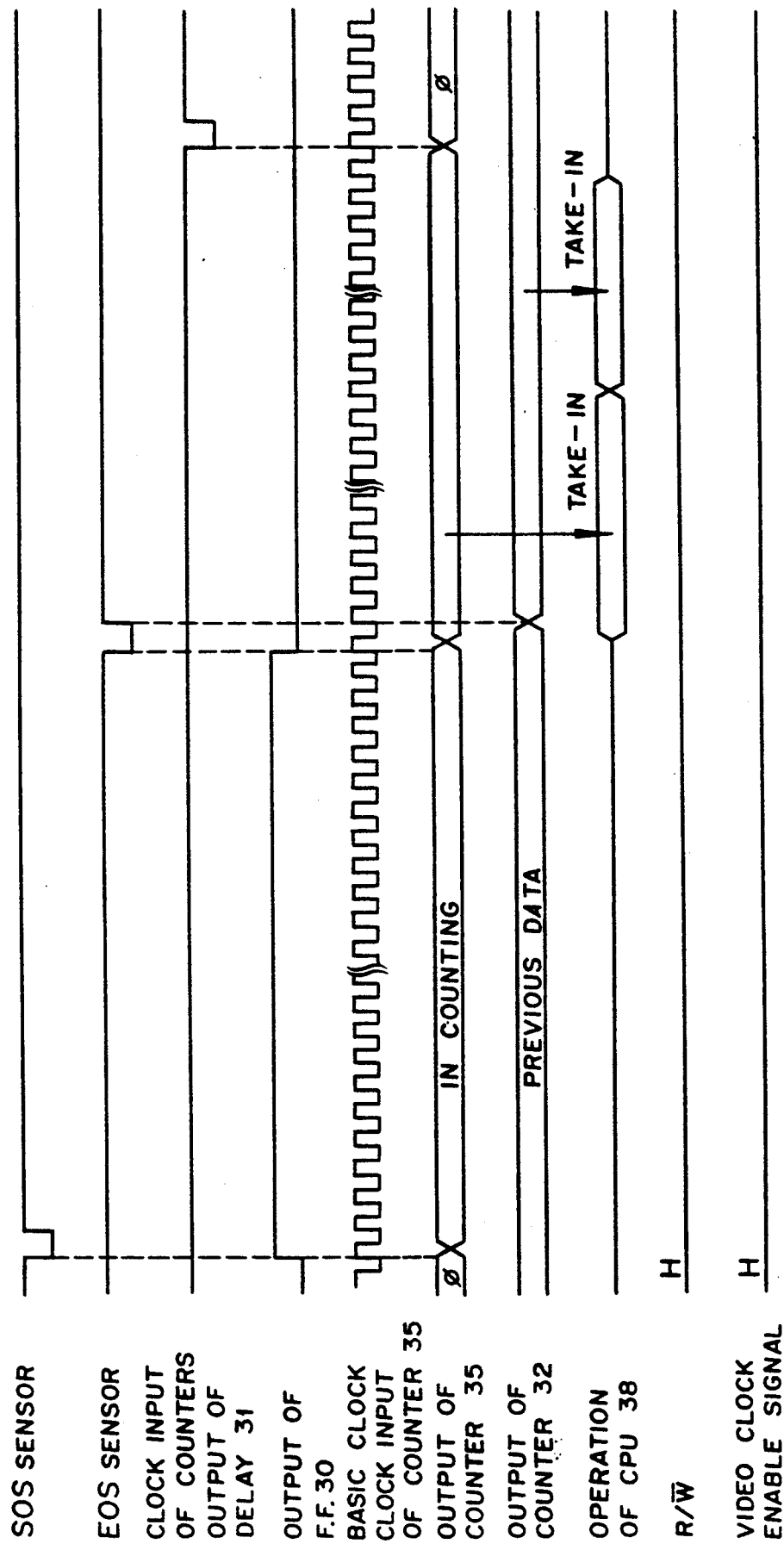
FIG. 3 is a timing chart of the operations of the component parts of the light beam scanning device of the present invention in the determination of the characteristics of the component mirror surfaces of a rotary polygonal-prism mirror.

The component members of the light beam scanning device of the present invention are operated as described above. Now, the functions of the circuits configured as described above will be explained below as broadly divided into three major operations with reference to the diagrams of FIG. 3 to FIG. 5.

1. Processing for determination of scanning characteristics of component surfaces of polygon mirror:

The polygon mirror 14 is set rotating as soon as the laser diode 10 emits the laser beam. When the scanning laser beam is detected by the SOS sensor 21, the SOS sensor 21 issues a pulse of the form illustrated in the timing chart of FIG. 3. The output of this pulse (output of low level) sets the flipflop 30 and, at the same time, causes the counter 35 to start taking count of the basic clock issued from the clock circuit 36. When the scanning with the laser beam advances and the EOS sensor 23 detects this laser beam, the EOS sensor 23 issues a pulse of the form illustrated in the same timing chart. By the output of this pulse (output of low level) resets the flipflop 30 and, at the same time, causes the counter 35 to cease taking count of the basic clock (information on time of scanning lines). Further, by the output of this pulse (initiation), the octal counter 32 is set to 1 (surface information of polygon mirror) and the CPU 38 is caused to memorize the numeral of count of the counter 35 with the set value of the octal counter 32 as an address. Then, the counter 35 is reset when the delay circuit 31 issues a signal after elapse of a prescribed time following the detection of the laser beam by the EOS sensor 23. The delay time in the delay circuit 31 is a duration necessary and sufficient for the CPU 38 to take in the numeral of count of the counter 35 based on the set value of the octal counter 32 after the detection of the laser beam by the EOS sensor 23. This duration, however, is shorter than the time required for the next scanning line to pass the SOS sensor 21.

The operation described above is repeated on all of the component reflecting surfaces of the polygon mirror 14. By measuring the numerals of count on the counter 35 for the component reflecting surfaces as described above, the times of scanning of the scanning lines on the component reflecting surfaces each between the points of the SOS sensor 21 and the EOS sensor 23 can be determined. The fact that a reflecting surface has a large numeral of count means that the scanning between the two points consumes time, namely that the scanning speed of the scanning line on that reflecting surface is slow. Conversely, the fact that a reflecting surface has a small numeral of count means that the scanning speed of the scanning line on that reflecting surface is fast.

While the processing described above is continuing, the CPU 38 keeps issuing a signal R/W prohibiting the writing in the memory 39 through a signal line 50 and, at the same time, a video clock enable signal prohibiting the 2. Processing for determination of time for starting output of video clock:

It is now assumed that, in consequence of the processing described above, the CPU 38 has obtained the following numerals of count, for example.

| 1. | 10000 |
| 2. | 10200 |
| 3. | 9700 |
| 4. | 10500 |
| 5. | 10100 |
| 6. | 9900 |
| 7. | 10200 |
| 8. | 10800 |

Here, 1 to 8 shown in the data above represent the surface information obtained by the octal counter 32 and the numerals of count shown to the right of the surface information represent time information obtained by the counter 35. The fact that a numeral of value of the counter is large means that the scanning line is proportionately short.

Figure 5:
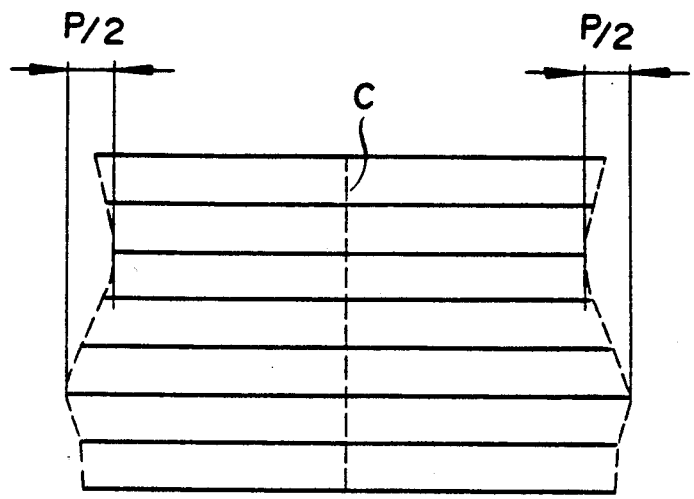
FIG. 5 is a diagram illustrating an image of scanning lines drawn by the light beam scanning device of the present invention.
Figure 6:
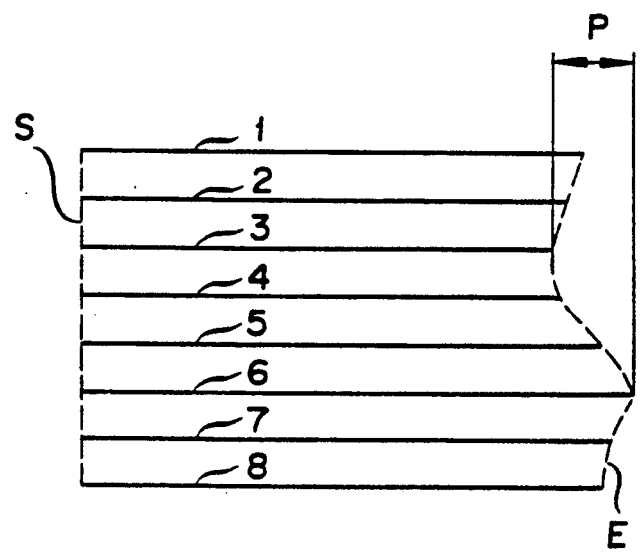
FIG. 6 is a diagram illustrating an image of scanning lines drawn by the conventional light beam scanning device.

By measuring the time of scanning between two given points of a scanning line as reduced to the numeral of count on the counter 35 as described above, the length of an image scanning line on each of the component reflecting surfaces during the presence of the video clock output can be estimated. For enabling the image scanning lines to assume such shapes as illustrated in FIG. 5 based on these numerals of count, it is necessary to assign to scanning lines of small numerals of count and consequently fast scanning speeds early times for starting the output of a video clock. The time thus advanced is decided based on the particular scanning line of the slowest scanning speed. The times of video clock out to be imposed on the individual scanning lines are advanced by one half of the respective differences between the numeral of count of the scanning line of the slowest scanning speed and the numerals of count of the rest of scanning lines, based on the scanning line of the slowest scanning speed. It follows that the CPU 38 performs the following arithmetic operation and commits the result of this operation to memory 39. Though the present embodiment uses the scanning line of the slowest scanning speed as the standard, a certain value useful as a reference may be set in advance.

The CPU 38, on obtaining these data, calculates the differences between the largest value in the data and the rest of the values of the data. In the data cited above by way of example, since the largest value is 10800, the difference thereof from the numeral of count of the first reflecting surface is 800, that from the numeral of count of the second reflecting surface 600, that from the numeral of count of the third reflecting surface 1100, that from the fourth reflecting surface 300, that from the numeral of count of the fifth reflecting surface 700, that from the numeral of count of the sixth surface 900, that from the seventh reflecting surface 600, and that from the numeral of count of the eighth reflecting surface 0. When the arithmetic operation mentioned above is completed, the CPU 38 commits to storage in the memory 39 the numerals obtained by multiplying the results of the arithmetic operation by ½.

The addresses at which the results of the arithmetic operation are stored in the memory 39 are each 1 less the addresses used during the introduction of the surface information because of the timing for switching the output of the octal counter 32.

During the introduction of the time information of the reflecting surfaces, the output of the octal counter 32 is given the increment by virtue of the EOS sensor 23 and as such taken in the CPU 38 as address information. In contrast, during the course of image formation, the output of the octal counter 32 which has been given the increment by the beam from the reflecting surface immediately preceding the reflecting surface currently being scanned with the beam is introduced into the memory 39 as address information. The apparatus under discussion, therefore, must be contrived so that the information read in and processed as address 2 will be used during the course of image formation when the octal counter 32 has issued the address 1.

The numerals of calculation memorized in the memory 39, therefore, are as follows.

| 1. | 300 |
| 2. | 550 |
| 3. | 150 |
| 4. | 350 |
| 5. | 450 |
| 6. | 300 |
| 7. | 0 |
| 8. | 400 |

The processings of 1. and 2. described above are desirably executed before the printing operation is actually started, for example, when the main power source is switched on, or, between the time that the printing switch is pushed on and the time that the printing operation is actually started.

Figure 4:
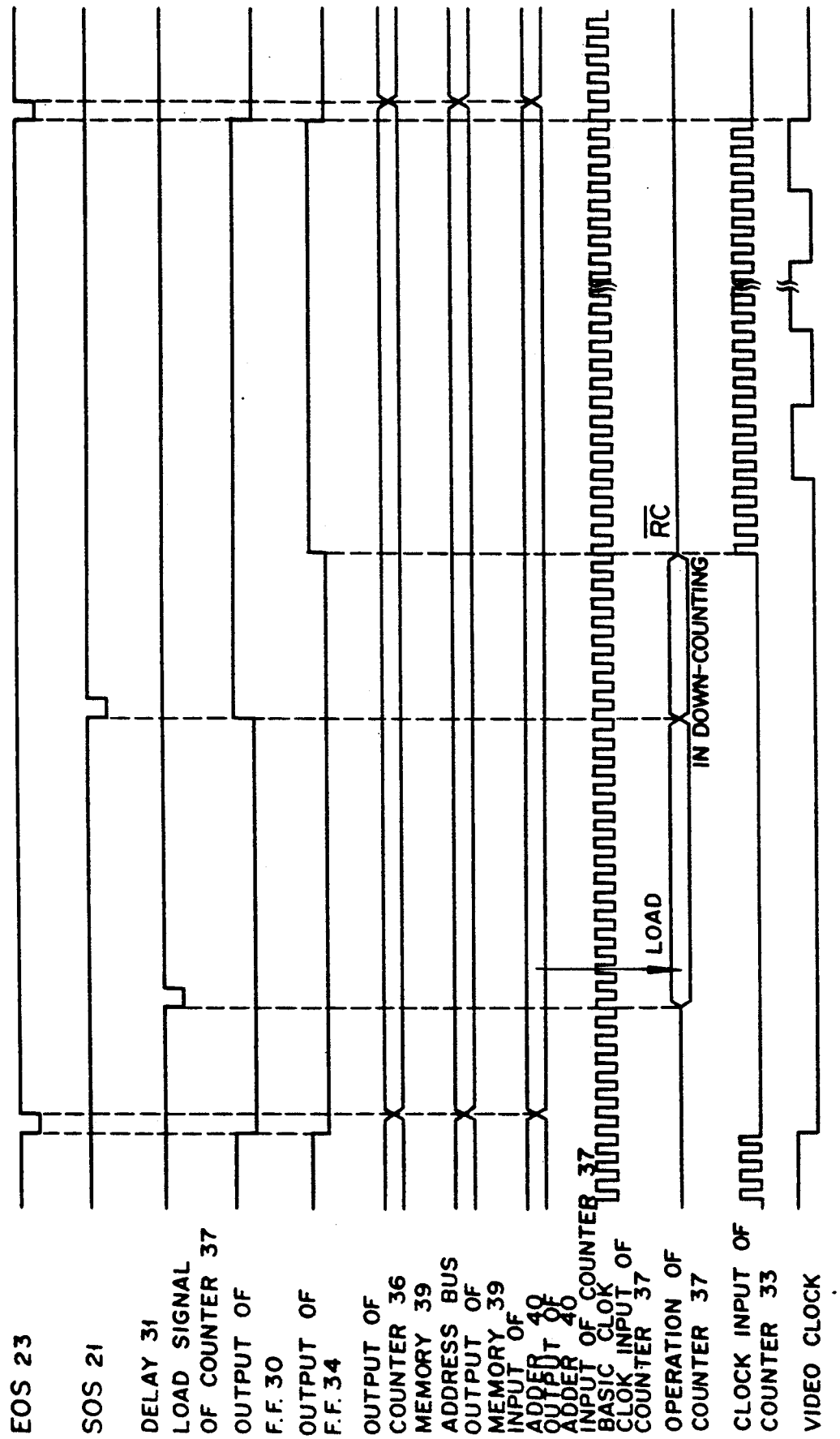
FIG. 4 is a timing chart of the operations of the component parts of the light beam scanning device of the present invention in the process of image formation.

3. Processing for initiating output of video clock:

The CPU 38, on receiving a command to print, sets the memory 39 ready for read-out through the medium of the signal line 50. The memory 39 feeds out the data previously written therein in response to the output issued at that time from the octal counter 32 (surface address). These data are added to the output from the reference value memorizing part 41 in the adder 40 and the result of the addition is loaded on the counter 37 by virtue of the output from the delay circuit 31. Then, the CPU 38 checks the flipflop 30 through the medium of the signal line 52 to confirm that the flipflop 30 is in the reset state and issues a video clock enable signal set in low level through the medium of the signal line 51, so that the flipflop 34 will be set by the signal fed out through the ripple carrier terminal of the counter 37. When the polygon mirror 14 is set rotating and the laser beam begins scanning and the SOS sensor 21 detects this laser beam, the SOS sensor 21 issues a pulse signal to set the flipflop 30 as illustrated in FIG. 4. The writing of the result of processing in the memory 39 by the CPU 38 is completed at the time that the processing of the surface information is completed and before the operation of image formation is started.

During the course of image formation in which the video clock is issued, the video signal alone is fed out. The output of the video signal is stopped on arrival of an external command to terminate the printing on one reflecting surface. The counter 37 is set in the active state by the setting of the flipflop 30 and consequently allowed to introduce the basic clock delivered from the clock circuit 36 and effect the down-count. The counter 37, before the operation described above is executed, is enabled to admit the data resulting from the addition in the adder 40 by virtue of the signal issued from the delay circuit 31 based on the signal issued from the EOS sensor 23. When the numeral of count in the count 37 is decreased to 0 in consequence of the down-count, the flipflop 34 is set by the signal issued through the ripple carrier terminal. When the flipflop 34 is set, the basic clock fed out of the clock circuit 36 is introduced through the AND gate 42 into the counter 33. The counter 33 divides a frequency of the introduced basic clock and feeds out a video clock. It is by the output of this video clock that an image is formed on the sensitive material 18. In other words, the operation for image formation is not executed in the absence of the output of video clock. When the laser beam is detected by the EOS sensor 23, the flipflop 34 is reset and the delivery of the output of the video clock is ceased. When the operation described above is repeated on the component reflecting surfaces in consequence of the rotation of the polygon mirror 14, the central positions C of the individual scanning lines are allowed to coincide. The data stored in the reference value memorizing part 41 are pulse numbers which correspond to constant delay times required to intervene between the time the laser beam is detected by the SOS sensor 21 and the time the video clock is fed out. They may be values such as 200, for example. The pulse number may be easily changed by means of a dip switch which is installed externally. The starting positions of the scanning lines can be readily changed by this dip switch.

Now, the operation described above will be explained further in detail below by the use of concrete numerical values. It is assumed that the aforementioned reference value for the scanning line traversing the first reflecting surface is 200. In the adder 40, the sum 600 of the data 400 from the memory 39 and the reference value 200 is set. At the time that the count of the basic clock issued from the clock circuit 36 after the detection of the laser beam by the SOS sensor 21 reaches 600, the output of the video clock is started. By this scanning line, the formation of image is initiated. While the formation of image is continuing, the processing described above is repeated on each of the component reflecting surfaces of the polygon mirror 14.

When the central positions of the individual scanning lines are caused to coincide as described above, it naturally follows that the starting positions and the ending positions of the scanning lines fail to coincide. Generally, there is a strong probability that a given image contains an important information in the central part thereof. The present invention which is aimed specifically at eliminating high-frequency jitter from the central part of an image, therefore, is highly effective in respect of improving the image quality. Moreover, the alignment of the central positions of the individual scanning lines contemplated by the present invention allows the maximum amount of jitter to be reduced to ½ as illustrated in FIG. 5, as compared with the alignment of the starting positions contemplated by the prior art. This fact goes to enhancing the quality of the image as a whole.

The embodiment described so far contemplates inclusion of the reference value memorizing part 41 and the adder 40 among its component parts. Where no use is found for the alteration of the starting positions of the scanning lines by means of the dip switch mentioned above, the reference value memorizing part 41 and the adder 40 may be omitted on the condition that the operation of addition otherwise performed by the adder 40 is assigned to the CPU 38.

The present embodiment is described as effecting the measurement of the scanning time on the component reflecting surfaces prior to the formation of an image. Optionally, the characteristics of the component reflecting surfaces of the polygon mirror 14 may be determined in advance and the data consequently obtained may be stored in a memory so as to be utilized during the course of image formation. It is also allowable that the data on the characteristics of the component reflecting surfaces between the time the laser beam passes the SOS sensor 21 and the time the output of the video clock is started may be stored in a memory and utilized during the image formation.

What is claimed is:

1. A light scanning device, comprising:
light emitting means for emitting a light beam;
image signal output means for providing an image signal for modulating said light beam;
scanning means provided with a rotary polygonal-prism mirror possessing a plurality of reflecting surfaces;
driving means for rotating said rotary polygonal-prism mirror at a prescribed speed and adapted to reflect said light beam and cause the reflected light beam to scan a target plane;
detecting means, including first and second light receiving means for receiving the light beam, for detecting the arrival of said light beam at prescribed positions at the opposite ends of the target plane;
arithmetic means for determining a scanning time on said target plane with respect to said plurality of reflecting surfaces based on outputs of said detecting means, whereby the arithmetic means determines a time period between reception of light by the first light receiving means and the second light receiving means and determines a reference scanning time necessary for scanning one line on each of said reflecting surfaces;
memory means for memorizing a reference scanning time on said target plane and a reference delay time intervening between the time said first light receiving means receives light and the time the issuance of said image signal is started, and
control means for controlling the timing of the issuance of an image signal from said image signal output means based on the result of the arithmetic operation with said arithmetic means, wherein said control means sets a longer time period for intervention between the time said first light receiving means receives light and the time the issuance of said image signal is started than said reference delay time when the scanning time on said target plane is longer than said reference scanning time, or sets a shorter time period for intervention between the time said first light receiving means receives light and the time the issuance of said image signal is started when the scanning time on said target plane is shorter than said reference scanning time, so as to control the timing for starting the issuance of said image signal from said image signal output means.

2. A light scanning device according to claim 1, wherein said arithmetic means further serves to calculate the timing between the time said first light receiving means receives light and the time the issuance of said image signal is started.

3. A light scanning device according to claim 1, wherein:
said rotary polygonal-prism mirror possesses first and second reflecting surfaces;
said arithmetic means calculates a first time difference between the scanning time on the target plane with said first reflecting surface and the reference scanning time and a second time difference between the scanning time on the target plane with said second reflecting surface and the reference scanning time; and
said control means, during the scanning with said first reflecting surface, uses a delay time extended or contracted from said reference delay time by one half of said first time difference for starting a reference scanning or, during the scanning with said second reflecting surface, uses a starting time extended or contracted from said reference delay time by one half of said second time difference for a starting reference scanning.

4. A light scanning device according to claim 1, wherein said arithmetic means executes said arithmetic operation when a main power source is turned on.

5. A light scanning device according to claim 1, wherein said arithmetic means executes said arithmetic operation when a command to print is received by said control means.

6. A light scanning device according to claim 1, wherein said reference scanning time is a maximum value in the scanning times on each of said reflecting surfaces.

7. A light scanning device according to claim 1, wherein said reference scanning time is a minimum value in the scanning times on each of said reflecting surfaces.

8. A light scanning device according to claim 1, wherein said reference scanning time is an average value in the scanning times on each of said reflecting surfaces.

9. A light scanning device, comprising:
light emitting means for emitting a light beam;
image signal output means for providing an image signal for modulating said light beam;
scanning means provided with a rotary polygonal-prism mirror possessing a plurality of reflecting surfaces;
driving means for rotating said rotary polygonal-prism mirror at a prescribed speed and adapted to reflect said light beam and cause the reflected light beam to scan a target plane;
detecting means, including first and second light receiving means for receiving the light beam, for detecting the arrival of said light beam at prescribed positions at the opposite ends of the target plane;
arithmetic means for determining a scanning time on said target plane with respect to said plurality of reflecting surfaces based on outputs of said detecting means, whereby the arithmetic means determines a time period between reception of light by the first light receiving means and the second light receiving means and determines a reference scanning time necessary for scanning one line on each of said reflecting surfaces;
control means for controlling the timing for the issuance of an image signal from said image signal output means based on the result of the arithmetic operation with said arithmetic means, wherein said control means controls the timing for starting the issuance of said image signal from said image signal output means by setting, as said reference scanning time and said reference delay time, the scanning time and the delay time on a prescribed one of said reflecting surfaces and, when the scanning time on the target plane is longer than said reference scanning time, setting a longer time for intervention between the time said first light receiving means receives light and the time the issuance of said image signal is started than said reference delay time or, when the scanning time on the target plane is shorter than said reference scanning time, setting a shorter time for intervention between the time said first light receiving means receives light and the time the issuance of said image signal is started.

10. A light recording device according to claim 9, wherein said arithmetic means executes said arithmetic operation when a main power source is turned on.

11. A light recording device according to claim 9, wherein said arithmetic means executes said arithmetic operation when a command to print is introduced to said control means.

12. A light scanning device according to claim 9, wherein said reference scanning time is a maximum value in the scanning times on each of said reflecting surfaces.

13. A light scanning device according to claim 9, wherein said reference scanning time is a minimum value in the scanning times on each of said reflecting surfaces.

14. A light scanning device according to claim 9, wherein said reference scanning time is an average value in the scanning times on each of said reflecting surfaces.

15. A light scanning device, comprising:
light emitting means for emitting a light beam;
image signal output means for providing an image signal for modulating said light beam;
scanning means provided with a rotary polygonal-prism mirror possessing a plurality of reflecting surfaces;
driving means for rotating said rotary polygonal-prism mirror to reflect said light beam and cause the reflected light beam to scan a target plane;
detecting means for determining a reference scanning time between two prescribed points to be scanned with said light beam by means of said polygonal-prism mirror, wherein one of the prescribed points to be detected by said detecting means is located prior to the target plane to be scanned, with said rotary polygonal-prism mirror in the direction of starting the scanning;

arithmetic means for calculating a reference delay time for starting the issuance of an image signal proper to each of said reflecting surfaces based on the reference scanning time determined by said detecting means with respect to each of said reflecting surfaces, said arithmetic means performing an arithmetic operation so as to set a longer delay time than said reference delay time when the scanning time on said target plane is longer than said reference scanning time, or to set a shorter delay time than said reference delay time when the scanning time on said target plane is shorter than said reference scanning time;

memory means for memorizing the time for starting the issuance of an image signal determined by said arithmetic means with respect to each of the reflecting surfaces of said rotary polygonal-prism mirror, said memory means memorizing, in advance, the reference scanning time on said target plane and the reference delay time preceding the start of the issuance of an image signal during the course of said reference scanning time, and control means for controlling the start of output from said image signal output means based on the time for starting the issuance of the image signal memorized in said memory means.

16. A light scanning device according to claim 15, wherein said reference scanning time is a maximum value in the scanning times on each of said reflecting surfaces.

17. A light scanning device according to claim 15, wherein said reference scanning time is a minimum value in the scanning times on each of said reflecting surfaces.

18. A light scanning device according to claim 15, wherein said reference scanning time is an average value in the scanning times on each of said reflecting surfaces.

19. An optical image writing device, comprising:

light emitting means for emitting a light beam;

image signal output means for providing an image signal for modulating said light beam;

scanning means provided with a rotary polygonal-prism mirror possessing a plurality of reflecting surfaces;

driving means for rotating said rotary polygonal-prism mirror and adapted to scan a target plane by reflecting said light beam;

light receiving means serving to issue a signal upon receiving said light beam and located prior to an image writing region in the direction of scanning, wherein the information on the timing for starting the issuance of said image signal is determined by the delay time between the reception of said light beam by said light receiving means and the start of issuance of said output;

memory means for memorizing information on the timing for starting the issuance of an image signal proper to each of said reflecting surfaces during the rotation of said rotary polygonal-prism mirror at a prescribed speed, wherein the timings for starting the issuance of the image signal are memorized in said memory means, said timings being that the differences in the timings for starting image formation on said reflecting surfaces are not more than one-half of the differences in the scanning times during the issuance of an image signal on each of said reflecting surfaces, and control means for controlling the start of the issuance of output from said image signal output means based on the information from said memory means.

20. A light scanning device, comprising:

light emitting means for emitting a light beam;

image signal output means for providing an image signal for modulating said light beam;

scanning means provided with a rotary polygonal-prism mirror possessing a plurality of reflecting surfaces;

driving means for rotating said rotary polygonal-prism mirror at a prescribed speed and adapted to reflect said light beam off of each reflecting surface to cause the reflected light beam to scan a target plane;

detecting means for detecting positions of the light beam relative to reflecting surface positions to provide an optical characteristic of a reflecting surface;

memory means for storing optical characteristics of each reflecting surface of said rotary polygonal-prism, and means for determining the starting time of applying the modulated light beam to the target plane for each of said reflecting surfaces in accordance with said optical characteristics, whereby image jitter is reduced.

21. A laser beam printer, comprising:

light emitting means for emitting a laser beam;

laser driving means for driving said light emitting means serving to emit a laser beam, based on an introduced image signal:

scanning means provided with a rotary polygonal-prism mirror possessing a plurality of reflecting surfaces and adapted to scan a target plane by reflecting said laser beam and rotating said rotary polygonal-prism mirror;

laser detecting means provided with a first detecting element disposed on one end side of said target plane scanned with said laser beam by means of said rotary polygonal-prism mirror and a second detecting element disposed at a prescribed position scanned with said laser beam by means of said rotary polygonal-prism mirror and adapted to detect the arrival of said laser beam;

counting means for taking a count of the scanning time between said first and second detecting elements on each of said reflecting surfaces;

first arithmetic means for determining the scanning time in the direction of main scanning effected by said rotary polygonal-prism mirror in the range of image formation with respect to each of said reflecting surfaces, based on the result of calculation of said counting means;

second arithmetic means for determining the delay time for intervention between the time the laser beam is detected by said first detecting element and the time the image formation is started with respect to each of said reflecting surfaces, said delay time being the shortest delay time for the reflecting surface found to have the longest scanning time and the longest delay time longer than the shortest delay time on the reflecting surface found to have the shortest scanning time; and control means for controlling the driving of said laser driving means based on the result of the determination of said second arithmetic means.

22. A laser beam printer according to claim 21, wherein said second detecting element is disposed on the other end side of said target plane and said first detecting element on the starting side of main scanning.

23. A laser beam printer according to claim 21, wherein the difference between said longest delay time and said shortest delay time is calculated by said second arithmetic means so as to equal one half of the difference between said longest scanning time and said shortest scanning time.

24. A laser beam printer according to claim 21, wherein:
said memory means memorizes the delay time determined by said second arithmetic means with respect to each of said reflecting surfaces; and
said control means controls the driving of said laser driving means in response to information from said memory means.

25. A laser beam printer according to claim 21, wherein said target plane is a light sensitive material.

26. A method for recording an image with an optical recording device provided with light emitting means for emitting a light beam, a rotary polygonal-prism mirror possessing a plurality of reflecting surfaces and serving to scan a recording medium, first detecting means for issuing a signal on detecting the reception of said light beam, and second detecting means for detecting the reception of said light beam at a prescribed position and adapted to issue an image signal for modulating said light beam with a delay of a prescribed delay time on receiving the signal from said first detecting means, which method comprises the steps of:
determining the time of main scanning in the image recording region based on the timings of detection by first detecting means and second detecting means with respect to each of said reflecting surfaces;
setting a reference scanning time and a reference delay time;
finding the difference between the scanning time and the reference scanning time for each of said reflecting surfaces; and deciding the delay time for each of said reflecting surfaces based on said differences.

27. A light scanning device according to claim 26, wherein said reference scanning time is a maximum value in the scanning times on each of said reflecting surfaces.

28. A light scanning device according to claim 26, wherein said reference scanning time is a minimum value in the scanning times on each of said reflecting surfaces.

29. A light scanning device according to claim 26, wherein said reference scanning time is an average value in the scanning times on each of said reflecting surfaces.

30. A method according to claims 26, wherein said delay time is determined by:
setting characteristic values smaller than said differences severally for said reflecting surfaces; and
adding said characteristic values to said reference delay time when the scanning times on said reflecting surfaces are longer than said reference scanning time; or
deducting said characteristic values from said reference delay time when the scanning times on said reflecting surfaces are shorter than said reference scanning time.

31. A method according to claim 30, wherein said variable values are set at one half of the differences between said scanning times and said reference scanning time for each of said reflecting surfaces.

32. A method for recording an image with an optical image recording device provided with light emitting means for emitting a light beam, means for issuing an image signal for modulating said light beam, a rotary polygonal-prism mirror possessing a plurality of reflecting surfaces and serving to scan a recording medium, and detecting means for detecting the reception of said light beam which method comprises the steps of:
committing to storage in memory means optical characteristics of the component reflecting surfaces of said rotary polygonal-prism mirror;
calling said optical characteristics of said reflecting surfaces from said memory means; and
deciding the timing for starting the issuance of an image signal for each of said reflecting surfaces, in accordance with said optical characteristics.

* * * * *